United States Patent
Parkhurst

[15] 3,643,975
[45] Feb. 22, 1972

[54] RETRACTABLE TONGUE STAND FOR TRAILERS

[72] Inventor: William R. Parkhurst, Sedalia, Mo.

[73] Assignee: Parkhurst Manufacturing Co., Inc., Sedalia, Mo.

[22] Filed: Feb. 3, 1970

[21] Appl. No.: 8,276

[52] U.S. Cl. ..................................................280/475
[51] Int. Cl. .....................................................B60s 9/02
[58] Field of Search ..............280/475, 150.5; 248/188.5, 248/352

[56] References Cited

UNITED STATES PATENTS 2,571,390  10/1951  Strand ...................................280/475
2,708,146  5/1955  Adler ......................................108/115
3,181,891  5/1965  Moats .....................................280/475
3,370,817  2/1968  Weber ..................................248/188.5

*Primary Examiner*—Leo Friaglia
*Attorney*—Schmidt, Johnson, Hovey & Williams

[57] ABSTRACT

A retractable tongue stand assembly has a pair of spaced, depending plates rigidly secured to the tongue which pivotally carry a rigid support member therebetween for swinging movement between retracted and extended positions. A spring-loaded latch is shiftable along a longitudinal track on the member into locking engagement with sets of notches on the plates to releasably lock the member in either its retracted or extended positions.

2 Claims, 5 Drawing Figures

PATENTED FEB 22 1972                3,643,975
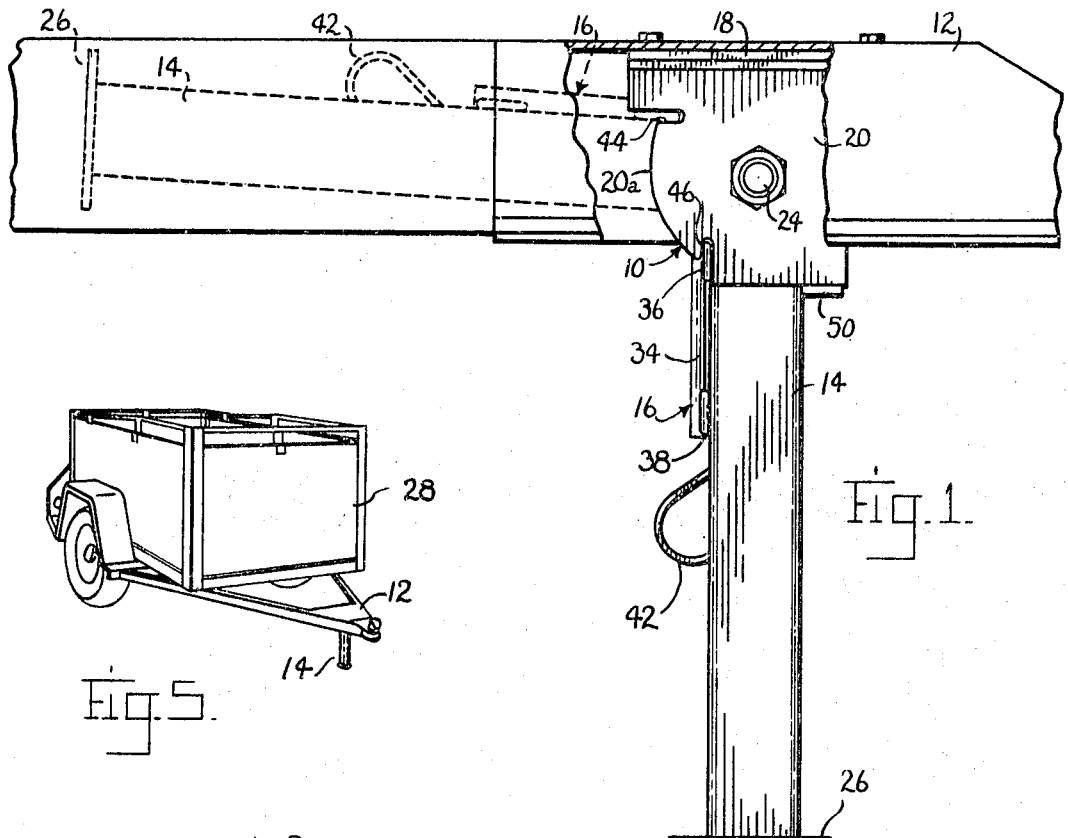
Fig.1.
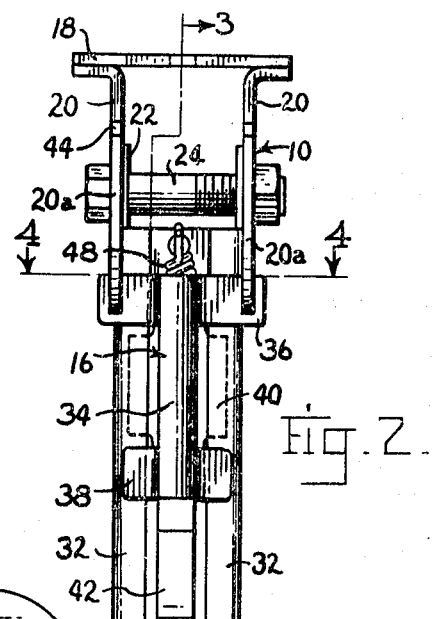
Fig.2.
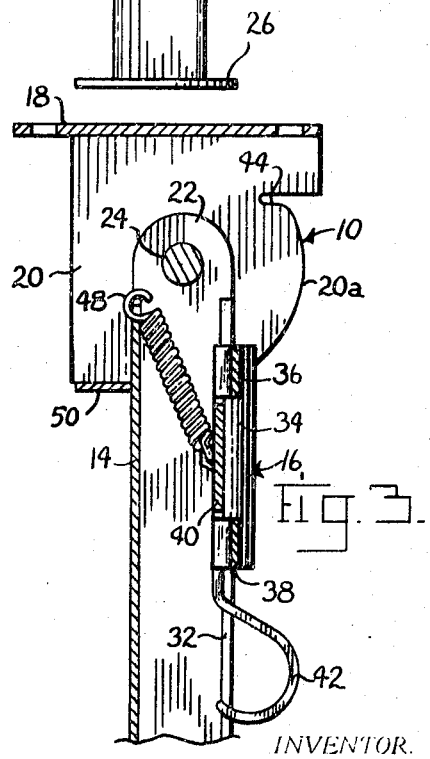
Fig.3.
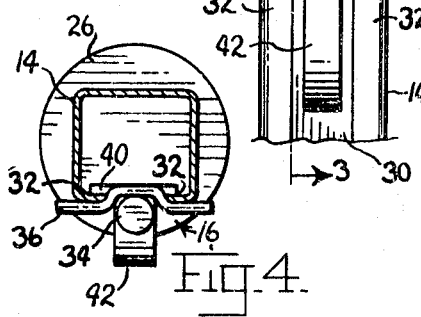
Fig.4.
Fig.5.
INVENTOR.
William R. Parkhurst
BY Schmidt, Johnson, Hovey
Williams & Chase
ATTORNEYS.

RETRACTABLE TONGUE STAND FOR TRAILERS

This invention relates to trailer stands and, more particularly, to a retractable stand for supporting the tongue of a trailer when the latter is not in use.

It is an important object of the present invention to provide a retractable trailer stand which is designed to be utilized as a permanent feature of the trailer, thereby providing a support for the trailer whenever the need may arise, thus eliminating the necessity for maintaining and transporting a separate stand unit.

Another important object of the present invention is to provide a stand having apparatus for selectively locking the stand in either its extended position during storage of the trailer or in its retracted position when the trailer is hitched for over-the-road use.

Other objects will be made clear or become apparent from the following specification and claims, wherein:

FIG. 1 is a fragmentary, side elevational view of a trailer tongue having a stand assembly secured thereto in its extended position, parts of the tongue being broken away to reveal components of the assembly, and the alternate retracted position of the stand being indicated by broken lines;

FIG. 2 is a fragmentary, front elevational view of the stand assembly in FIG. 1;

FIG. 3 is a fragmentary, substantially vertical cross-sectional view of the assembly taken along line 3—3 of FIG. 2;

FIG. 4 is a horizontal cross-sectional view of the assembly taken along line 4—4 of FIG. 2; and FIG. 5 is a perspective view of a trailer on a reduced scale utilizing the stand assembly of FIGS. 1–4.

The stand assembly of the present invention basically includes a mounting unit 10 for rigidly securing the assembly to a trailer tongue 12, a rigid support member 14 pivotally carried by the mounting unit 10 for swinging movement between extended and retracted positions, and locking apparatus 16 for selectively locking the member 14 in either of such positions. The mounting unit 10 includes a flat top plate 18 having a pair of spaced, depending side plates 20 welded or otherwise rigidly secured thereto. Plate 18 is provided with suitable holes for receiving bolts or other fastening devices to rigidly secure the assembly to tongue 12.

The member 14 is formed from a section of sheet material having a pair of opposed lugs 22 at the uppermost end thereof which fit against the opposed inner faces of plates 20 and receive a pivot shaft in the nature of a bolt 24 carried between the plates 20. The member 14 is thereby adapted for swinging about the longitudinal axis of bolt 24 between its retracted and extended positions. A pad or foot 26 is secured to the lowermost end of member 14 for engaging the ground when member 14 is extended and the trailer is prepared for storage, such as the trailer 28 of FIG. 5.

The locking apparatus 16 includes interengageable structure on the plates 20 and on the member 14. More specifically, member 14 is provided with a longitudinal trackway 30 on one side thereof defined by spaced, overhanging flanges 32 which slidably carry a latch 34. Latch 34 has two sets of wings 36 and 38 which extend outwardly therefrom in opposite directions and ride along the outer faces of the flanges 32. A set of oppositely projecting wings 40 on latch 34 ride along the inner faces of flanges 32, thereby retaining latch 34 within the trackway 30 during use. A finger-engaging hook 42 at the lower end of latch 34 provides a convenient means for grasping and operating the latch 34.

The locking structure on the plates 20 comprises a horizontally extending notch 44 in the upper region of each plate 20 corresponding to the retracted position of member 14, and a vertically extending notch 46 in the lower portion of each plate 20 corresponding to the extend position of member 14. A return spring 48 on latch 34 yieldably biases the wings 36 into locking engagement with the notches 44 or 46 to firmly hold member 14 in either its retracted or extended positions. In addition, a brace 50 spanning the plates 20 across the rearmost lower edges thereof serves as a supplemental stop means for the member 14 in its lowered position.

The arcuate leading edges 20a of plates 20 serve as bearing surfaces for the wings 36 during retraction or extension of member 14 as will hereinafter become apparent. It may be appreciated that the present stand assembly is designed to be carried by the trailer at all times, even when the stand is retracted and not in use. Accordingly, the stand is always conveniently available to support the trailer tongue whenever the need arises. Since the stand is always stored in its retracted position on the tongue, there is no difficulty in locating a suitable support for the trailer should an emergency arise. Thus, when the trailer is to be unhitched from the towing vehicle, the member 14 of the stand assembly may be easily placed in its extended position by grasping hook 42 of the latched 34 to disengage the wings 36 from notches 44. With wings 36 removed from the notches 44, the member 14 may be swung into its lowered position as the upper edges of wings 36 bear against the arcuate plate edges 20a.

Once the member 14 assumes a substantially vertical disposition as shown in the figures, the spring 48 pulls latch 34 upwardly in trackway 30 to seat the wings 36 within notches 46. The trailer may then be safely lowered until foot 26 engages the ground.

Preparing the trailer for over-the-road use is simply a reversal of the above process wherein the latch wings 36 are pulled out of engagement with notches 46 against the will of spring 48 and the member 14 thereafter rotated into its retracted position, permitting the wings 36 to seat in notches 44.

Having thus described the invention, what is claimed as new and desired to be secured by Letters Patent is:

1. In combination with the tongue of a towable vehicle, a retractable stand assembly comprising:
   a rigid support member;
   means pivotally mounting said member on the tongue swinging movement between an upper retracted position and a lower extended position,
   said mounting means including at least one upright plate carried by the tongue, and a pivot shaft carried by said plate,
   said shaft supporting the member adjacent one end of the latter for rotation about the longitudinal axis of the shaft; and
   locking apparatus including cooperating, interengageable structure for selectively locking the member in said retracted and extended positions,
   said interengageable structure including a pair of spaced notches formed in said plate and corresponding to said retracted and extended positions of the member respectively,
   said structure also including a latch shiftably mounted on the member for movement into and out of locking engagement with said notches,
   said member having a longitudinal trackway for slidably carrying the latch and defined by spaced, overhanging flanges having inner and outer surfaces respectively,
   said latch having a first set of wings extending outwardly therefrom in opposite directions for riding along said inner flange surfaces, and a second set of wings extending outwardly therefrom in opposite directions for riding along outer flange surfaces.

2. A stand assembly as set forth in claim 1,
   there being spring means attached to said latch yieldably biasing the latter into locking engagement with said notches.

* * * * *